H. B. LAYMAN.
CONNECTING ROD.
APPLICATION FILED APR. 5, 1916.
1,418,083.
Patented May 30, 1922.
5 SHEETS—SHEET 5.
FIG. 13.  FIG. 14.  FIG. 15.
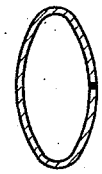  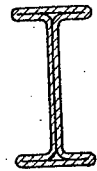
FIG. 16.  FIG. 17.  FIG. 18.
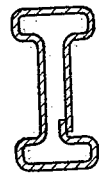 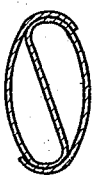 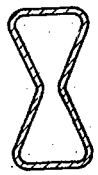
FIG. 19.  FIG. 20.  FIG. 21.
 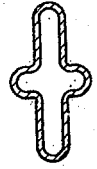 
FIG. 22.  FIG. 23.  FIG. 24.
  
Hebron B. Layman, Inventor

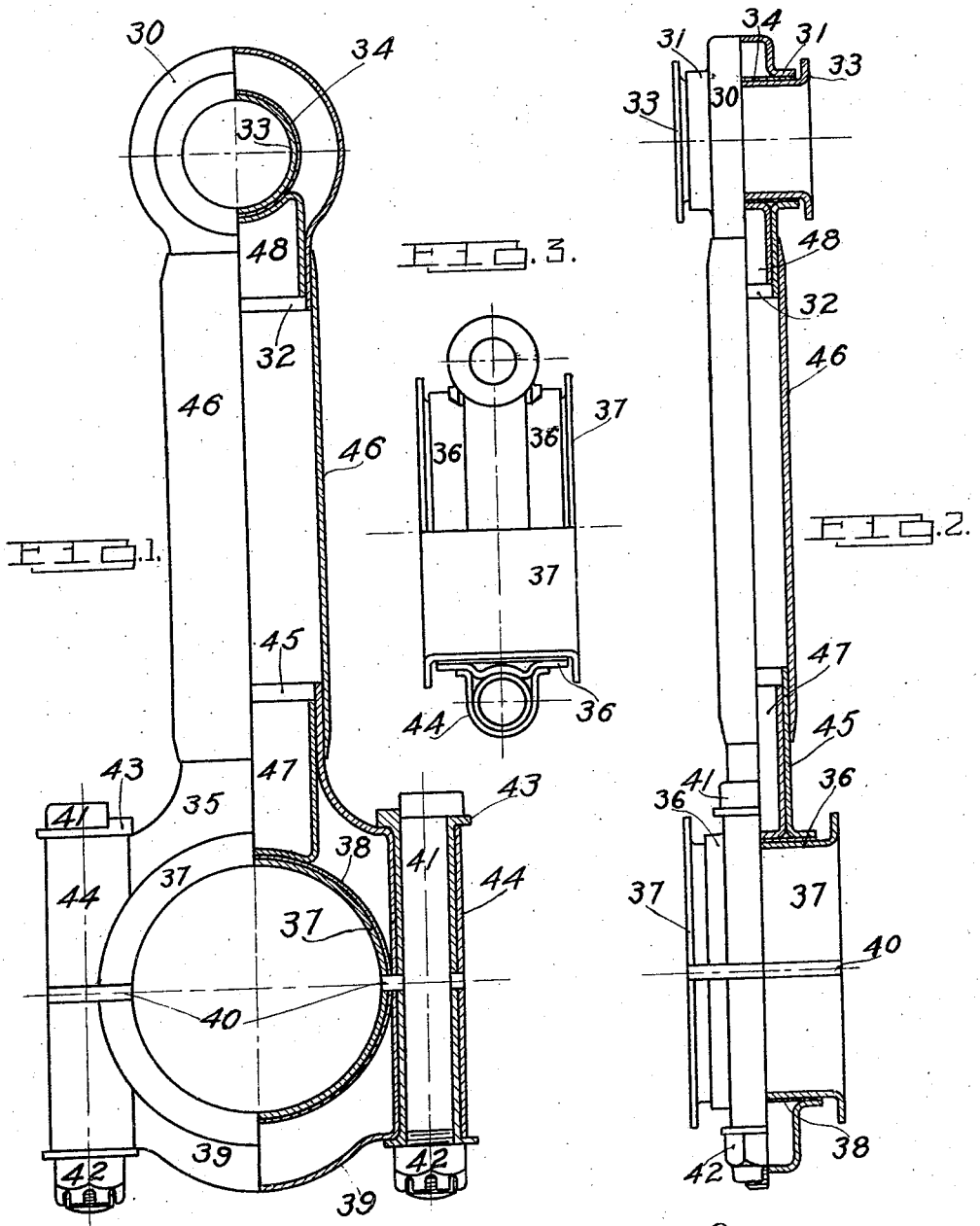

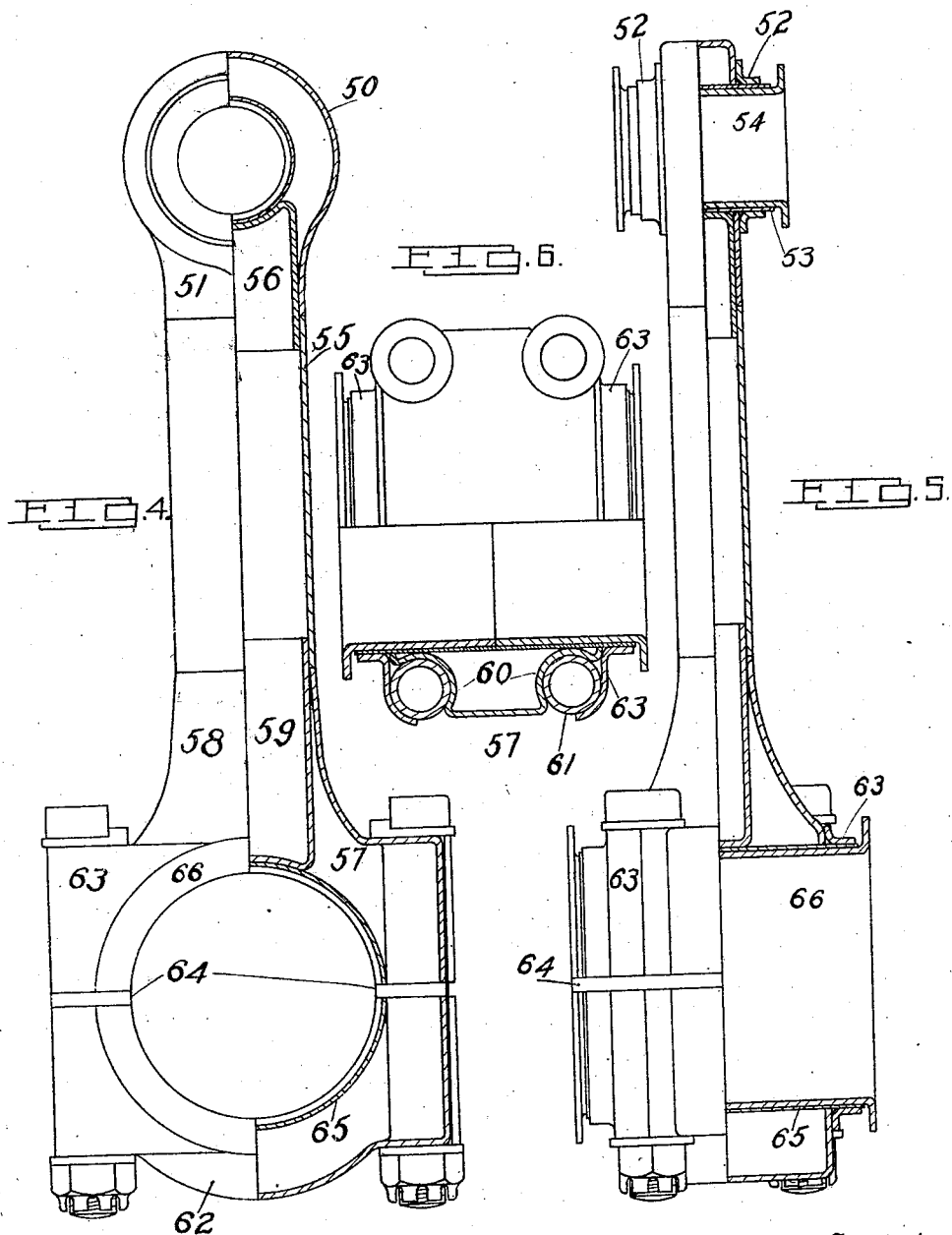

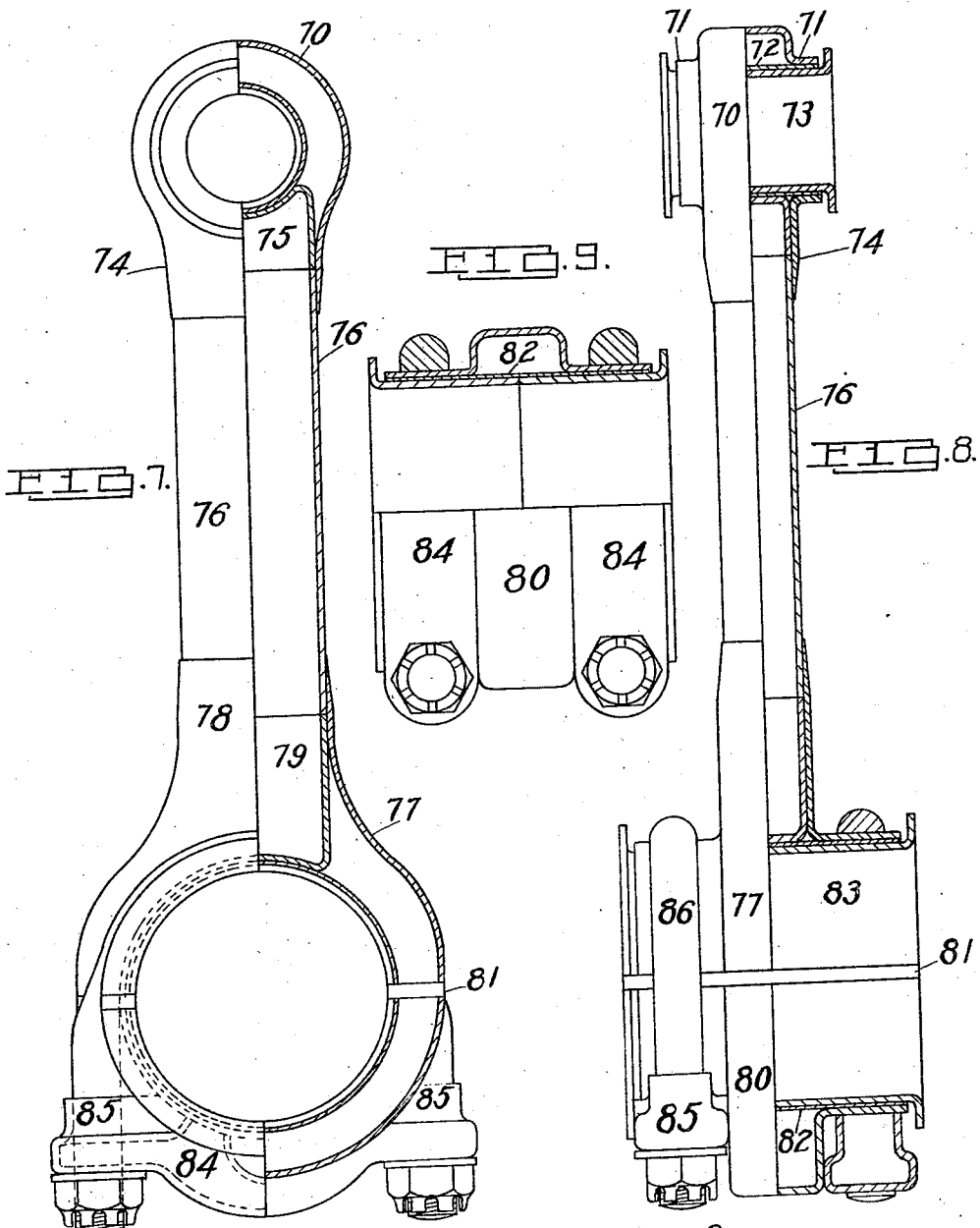

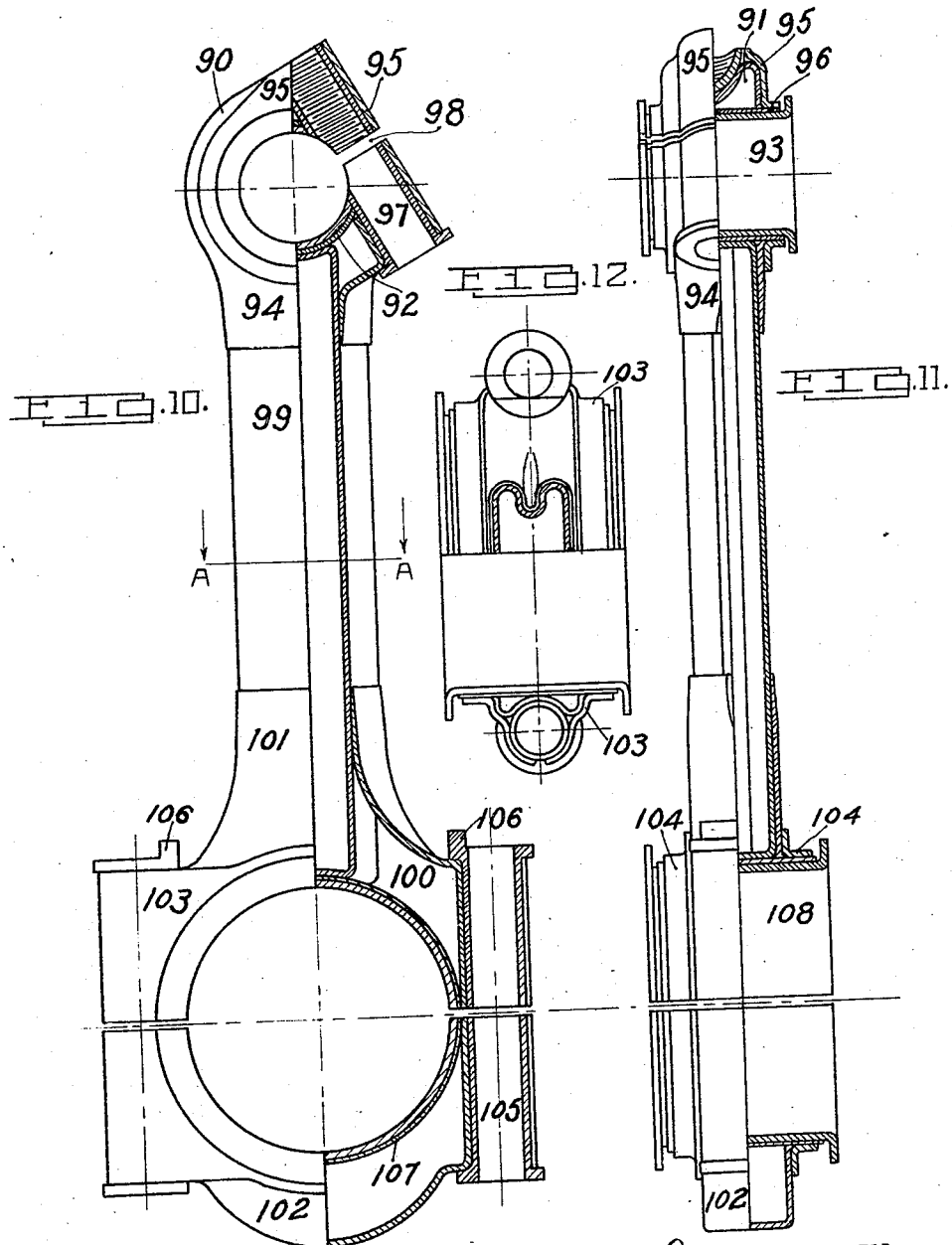

UNITED STATES PATENT OFFICE.

HEBRON B. LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING ROD.

1,418,083.   Specification of Letters Patent.   Patented May 30, 1922.

Application filed April 5, 1916. Serial No. 88,989.

*To all whom it may concern:*

Be it known that I, HEBRON B. LAYMAN, a citizen of the United States, and residing at New York, in the county of New York and State of New York, have invented certain new and useful Improvements in Connecting Rods, of which the following is a specification, such as will enable those skilled in the art to which it appertains to make and use the same.

This invention relates to multi-part sheet metal connecting rods. The objects of this invention reside in the provision of a rod which may be manufactured at a low cost and without excessive duplication in tools, and in which the completed rods will be strong, light and uniform in weight. Other advantages of the rod will appear hereafter.

By way of example, I show in—

Fig. 1 is a side elevation, one-half in section, of sheet metal connecting rod, embodying features of the invention.

Fig. 2 is an elevation at right angles to Fig. 1, showing the same rod, one-half in section.

Fig. 3 is a view of the bottom of the rod of Fig. 1, one-half showing the exterior of the cap, the other half showing the abutting face of the rod at its junction with the cap.

Figs. 4, 5, and 6 show modified forms of a sheet metal connecting rod, embodying features of the invention, and the three views correspond to the Figs. 1, 2 and 3.

Figs. 7, 8, and 9 show yet another rod embodying modifications of the invention, and these three figures also correspond with Figs. 1, 2, and 3.

Figs. 10, 11 and 12 show a fourth connecting rod of modified form, and these Figures also correspond to Figs. 1, 2 and 3.

Figs. 13 to 24 inclusive are cross sections of modified forms of the shank portion of connecting rods, links, levers or the like embraced in this invention, and more particularly referred to hereafter.

In Figures 1 to 3—30 is the piston head end of a sheet metal connecting rod. It consists of a substantially cylindrical body, having integral extending perforated bosses 31, and integral shank-stub 32. This piston head end is drawn from a single piece of sheet metal, longitudinally jointless.

The perforated bosses 31 form a cylindrical aperture adapted to receive a piston pin. To reinforce this boss and to provide an adequate bearing for the piston pin, it is fitted with two flanged bushings 33, which abut at the center line of the rod. These bushings are in turn backed-up by a third bushing designated 34.

The crank head end 35 of the rod, like the piston head end, has integral outwardly extending flanges 36, which together form a crank pin boss. This boss is fitted with flanged bushings 37, in turn backed-up by a rolled bushing 38.

This crank head end is shown divided transverse the axis of the crank end boss to form a cap 39. In practice the crank head end and the cap of this particular rod are formed from a single piece of sheet metal, and after the bushings 37 and 38 are in place and other operations performed, as hereafter described, the cap is finally cut from the crank head end.

40 are shims provided as means for adjusting the bearing to take up wear. The cap is secured to the rod by bolts and nuts 41 and 42, which are passed through flanged ferrules 43, which are fitted in depressions formed in the crank head end and cap, and are secured thereto by means of semi-cylindrical formed pieces of sheet metal 44. In practice these pieces are spot-welded to lock them in place and are later brazed.

45 is an integral tubular shank-stub formed integral with the crank head end. 46 is a seamless tubular shank formed from a single piece of sheet metal, and is fitted over the shank-stub 32 of the piston end and the shank-stub 45 of the crank head end, and is secured thereto in any desirable manner. In practice I have preferred to secure such parts by spot-welding and later by brazing.

47 is a shank reinforcing member. The purpose of this is to adequately unite the crank pin boss, formed of the elements 36, 37 and 38, to the shank. This member 47, as shown, is a drawn steel cup. In actual service in a gas engine the shank of a connecting rod acts as a battering ram transmitting the blows of the piston to the crank pin bearing. Heretofore some sheet metal connecting rods have failed in service in the region of the union of the shank and the crank head end. To overcome this, the reinforcing member 47 forms a continuation of the shank within the crank head end, and effectually unites the shank directly to the crank pin boss, which backs-up the usual crank pin bearing, which is not shown in these drawings.

48 is a similar shank reinforcing member for the piston pin end. At the piston pin end this shank reinforcing member is of special value. Heretofore sheet metal connecting rods have been weak under tension in the region of the union of the piston pin boss—shown at 31—and the shank of the rod. This reinforcing member increases the cross section of the rod at this point and enlarges the area of union of the bushing in the piston pin aperture with the shank.

In Figs. 4, 5, and 6, 50 is a longitudinally jointless or seamless piston head end, drawn from a single piece of sheet metal, having a tubular shank-stub 51, oval in cross section. It has a piston pin boss formed by cutting apertures in it, and around these are stamped steel members 52, which, uniting with the piston head end, compose the piston pin boss. By constructing the piston head end with applied parts, the operations required for forming the piston head end are reduced in number. Then, too, the members 52 form radial reinforcing flanges around the piston pin aperture, aiding in preventing the boss from going out-of-round in service.

53 is a reinforcing bushing fitted within the piston pin boss, and 54 is a flanged reinforcing bushing. These flanges serve the double purpose of reinforcing the boss circumferentially and radiating the heat of the piston pin.

The shank-stub 51 is shown butt-welded to an oval shank 55. Within the shank is a piston end shank-reinforcing-member 56. This member in addition to serving, as previously outlined, also reinforces the welded joint of the shank and the shank-stub.

57 is a crank head end formed seamless from a single piece of sheet metal. It is provided with a shank-stub 58 and welded to the shank 55. It has a shank reinforcing member 59, serving as does the member 56. This crank head end has four depressions 60 formed in its outer face. These are substantially semi-cylindrical, and are adapted to receive ferrules 61, which in turn receive bolts to secure cap 62 in place. This cap 62 may be formed with the crank head end. I prefer to so make this cap but it is not necessarily so made.

63 are formed pieces of sheet metal. These co-operate to form a crank pin boss and bolt bosses. 64 are shims to take up the wear of the bearing. 65 is a liner bushing within the crank pin aperture. 66 is a flanged bushing within the crank aperture, the flanges of which reinforce the boss circumferentially, and also distribute the heat generated in the bearing.

In Figs. 7, 8 and 9—70 is the piston head end drawn from a single piece of sheet metal, and having hollow cylindrical portions 71, which co-operate to form a piston pin boss. 72 is a liner bushing and 73 a flanged reinforcing bushing. 74 is a shank-stub. 75 is a shank reinforcing member for the piston end, which is united by butt-welding or by any other desirable manner to the shank 76, which, in this instance, is oval in cross section. 77 is the crank head end having a shank-stub 78, having an interior reinforcing member 79 united to the shank 76. It will be observed that the shank-stub 78 encircles and reinforces the joint of the shank to the shank reinforcing member. 80 is a cap which I prefer to, but need not, form integral with the crank head end 77. 81 are shims properly spacing the cap. 82 is a liner bushing for the crank pin boss, and 83 is a flanged reinforcing bushing.

The cap portion of the rod is provided with supplementary caps 84, which are preferably welded and brazed to it. These supplementary caps have bosses 85 to receive bolts or U-shaped clamps.

It should be observed that the crank head end has a broad raised portion, forming a substantial reinforcing rib extending clear around it.

In Figs. 10, 11 and 12—90 is a piston head end having cylindrical apertures at 91. 92 is a liner bushing, 93 a flanged bushing. 94 is a shank-stub formed integral with the piston head end.

In one side of the piston head end, a piston pin pinch bolt boss is formed, partly by the piston head end, and partly by a U-shaped member 95, which more than half encircles the piston head end. This U-shaped member 95 has extending cylindrical portions 96, which co-operate to form the piston pin boss. The pinch bolt boss is provided with a reinforcing ferrule 97, which is threaded to receive the cap screw or stud. At 98, midway the length of the boss, a saw cut is made to allow the boss to be pinched around the piston pin. 99 is an H section shank formed of a piece of steel tubing and having both ends swaged over. This shank 99 thus, virtually, has the shank reinforcing members of the previous figures formed integral with it.

100 is the crank head of the rod, provided with shank-stub 101, adapted to receive the shank 99 and the cap 102, which I prefer to form integral with the crank head end. 103 are formed pieces of sheet metal, which have cylindrical portions 104, co-operating to form the crank pin boss. It will be observed that these members are shaped to form oppositely disposed bolt bosses to secure the cap in place.

105 are ferrules within the bolt boss. 106 are lipped washers on one end of the bosses to prevent the bolts from turning. 107 is a liner bushing in the crank end; 108 a flanged bushing.

As previously stated, Figures 13 to 24 inclusive show cross sections of modified forms of shanks I may elect to use.

Fig. 13 is an oval section shank, formed from a flat piece of sheet metal, having its abutting edges welded or brazed.

In Fig. 14 an oval section is shown formed from two similar parts of sheet metal.

In Fig. 15 is shown an I section formed from a single piece of sheet metal. This section is first drawn as a round tube and afterwards, by proper manipulation, closed to form the I section shown. I may, however, make this I section from a plurality of pieces.

Fig. 16 shows a hollow I section, formed from a single piece of sheet metal, and having a lapped joint.

Fig. 17 is a cross section of a shank formed from one piece of sheet metal, and is a composite of an oval and an S section.

Fig. 18 is a hollow section formed in much the same manner as the section of Fig. 15 already referred to.

Fig. 19 shows an oval, generally having a wall formed of two thicknesses of material.

Figs. 20, 21 and 22 are modifications of shanks to be formed, preferably, as outlined in explanation of Fig. 15.

Fig. 23 is a cross section of an oval shank, formed from two pieces of material, and having a central flange of double thickness extending along the major axis of the oval.

Fig. 24 is again a modification of shank to be made as outlined in explanation of Fig. 15.

Heretofore I have used the word "shell" in referring to the main part of the connecting rod. By "shell" I mean the shank portion and one or both end portions associated therewith, exclusive of cap or flanged bushings, or liner bushings, or bolt boss bushings, or shank reinforcements, or similar small parts. My use of the word shell will apply with equal force to connecting rods with or without caps. Rods of the latter class I have described in U. S. Patent No. 1,176,300.

Hereafter in the claims I will use the term "multi-part shell." By multi-part shell I mean a connecting rod shell as above defined, and comprising a shank and at least one separate or independent head member, which is afterwards joined to the shank by brazing, fusing or welding. By "multi-part shell" it will be understood that the term defines generically a shell made up of a plurality of parts, in which the junction or junctions of the parts extend substantially transversely to the longitudinal axis of the shell.

Where I use the term "sheet metal" hereinafter in the claims, I wish it understood that I mean any form of metal which partakes of the nature and characteristics of sheet metal, as distinguished from the characteristics of castings and forgings.

Where I have shown the various modifications of the invention, I do not mean to limit myself to exact arrangement of parts shown in the drawings, for I am aware that many other modifications may be made within the scope of the appended claims.

Having fully described my invention, what I claim as new and desire to secure by Letters Patent, is:—

1. A multi-part connecting rod shell including a shank, an independent sheet metal member apertured to receive a wrist pin, and having a lining within said aperture and means connecting the lining with the shank, whereby the thrust of the wrist pin may be transmitted to the shank independent of the head member.

2. A multi-part connecting rod shell including a pair of sheet metal head members joined by a shank; said head members being apertured to receive pins, linings within the said apertures, and means independent of the head members uniting the linings to said head members and cooperating with the shank portion of the shell to form a substantial load-carrying structure.

In testimony that I claim the foregoing as my invention I have signed my name in presence of the subscribing witnesses this 20th day of March, 1916.

HEBRON B. LAYMAN.

Witnesses:
M. C. MEYER,
H. A. SOULIS.